Patented Mar. 27, 1945

2,372,410

UNITED STATES PATENT OFFICE 2,372,410

PROCESS FOR THE PRODUCTION OF
2-OXAZOLINES

Philip F. Tryon, Terre Haute, Ind., assignor to
Commercial Solvents Corporation, Terre Haute,
Ind., a corporation of Maryland No Drawing. Application April 12, 1943,
Serial No. 482,760

4 Claims. (Cl. 260—307)

This invention relates to the production of 2-oxazolines, and more particularly to a novel process for preparing such compounds from O-acylated hydroxy amides.

The 2-oxazolines capable of being synthesized in accordance with the present invention may be represented by the following structural formula:

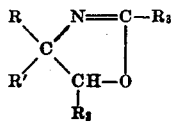

in which the substituents R and R' represent hydrogen, alkyl, aryl, or acyloxyalkyl, and $R^2$ and $R^3$ represent hydrogen or alkyl.

As examples of 2-oxazolines included by the above formula, there may be mentioned 2,4-dimethyl-4-acetoxymethyl-2-oxazoline, 2 - pentyl-4,5-dimethyl-4-(hexanoöxyethyl)-2-oxazoline, 2-methyl-4,4-bis(acetoxymethyl)- 2 - oxazoline, 2-ethyl-4,4-dimethyl-2-oxazoline, 2,4 - dimethyl-2-oxazoline, 2-ethyl-4-methyl-2-oxazoline, 2-pentyl-4,4-bis(hexanoöxymethyl)-2-oxazoline, 2,4,5-trimethyl-4-(acetoxyethyl)-2-oxazoline, 2-methyl-5 - ethyl - 4 -(acetoxypropyl)- 2 - oxazoline, 2-methyl-4-phenyl-2-oxazoline, 2-pentyl-4-phenyl-2-oxazoline, and the like.

Heretofore, the 2-oxazolines have been prepared by reacting certain amino hydroxy compounds with fatty acids, in approximately equimolecular proportions. They have also been prepared from acylamino carbinols by thermal decomposition with the elimination of water, and also by the treatment of N-acylamino carbinols with acid dehydration agents.

I have now discovered that the 2-oxazolines of the type represented by the above structural formula can be readily and effectively prepared from O-acylated amides having the following structural formula:

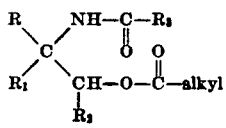

wherein the substituents R and R' represent hydrogen, aryl, alkyl or alpha acyloxyalkyl, and the substituents $R^2$ and $R^3$ represent hydrogen or alkyl.

In accordance with my invention, 2-oxazolines of the aforesaid class can be produced by subjecting an O-acylated amide of the above-mentioned type to thermal decomposition, whereby the acyl group present in the said amide is removed therefrom in the form of the corresponding aliphatic acid. This is considered to be indeed surprising, since it would normally be expected that thermal treatment of the compounds in question would result merely in their evaporation and the recovery thereof as such by means of condensation.

The reaction upon which the present invention is based appears to proceed somewhat as follows:

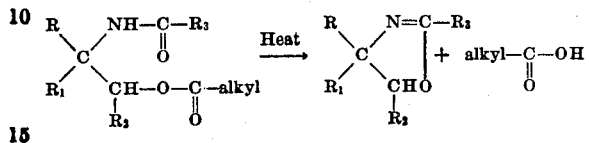

Examples of the acylated amides that can be utilized in the preparation of the aforesaid 2-oxazolines are: tris(acetoxymethyl)acetylamino methane, 2-acetamido-2-methyl-1,3-propanediol diacetate, 2-acetamido-2-ethyl - 1,3 - propanediol diacetate, 2-caproamido-2-methyl-1,3 - propanediol dicaproate, beta-acetamidoisobutyl acetate, beta-acetamidoisobutyl propionate, beta-acetamidoisobutyl butyrate, 2-acetamido-1-methylpropyl acetate, 2-acetamido-1-methylpropyl butyrate, and the like.

It will be noted that the compounds covered by the above formula all possess ester and amide groups. Pyrolysis of these compounds causes ring closure by detachment of the elements of a carboxylic acid. The acyl group of the ester is consumed in this manner as the oxazoline is formed. The presence of an acid in the reaction mixture, however, tends to inhibit completion of the reaction by providing conditions that favor the reverse reaction, i. e., the oxazoline and aliphatic acid thus produced react to reform the original O-acylated amide.

In accordance with my invention, however, such undesirable conditions are avoided by continuously removing the free acid as it is formed thereby permitting the reaction responsible for the production of the oxazolines to proceed substantially to completion.

In carrying out my invention, I heat the desired O-acylated amide under distilling conditions to split off the acyl group and form the 2-oxazoline ring structure, as described above, the temperature being maintained at a value that is in excess of the boiling point of the aliphatic acid produced, at the pressure employed. Although I have found it preferable to remove the acid from the reaction mixture by means of distillation, this object may likewise be accomplished by any other suitable means such as for example, by neutralization of said acid as it is produced. Completion of the reaction is evidenced by the removal of approximately the theoretical amount of acid. The still residue, thus obtained, consists principally of the corresponding 2-oxazoline compound, which may be further purified, if desired, in a known manner.

Examples illustrative of this process are given below:

*Example I*

One hundred twenty grams of tris(acetoxymethyl)-acetylamino-methane was introduced into a reaction vessel equipped with an efficient fractionating column. Heat was then applied to the vessel, whereupon 23 grams of acetic acid was distilled off at 116° C. vapor temperature and at a liquid temperature of 200–240° C. Fractionation of the residue gave 64 grams of colorless 2-methyl-4,4-bis(acetoxymethyl)-2-oxazoline at 2 mm. pressure, indicating a 68 per cent conversion. The compound thus produced was soluble in water, alcohol and ether, and has the following structural formula:

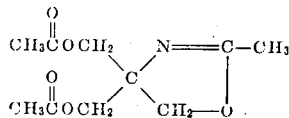

*Example II*

2-ethyl-4-methyl-4-propionoxymethyl-2-oxazoline was prepared by heating one mole of 2-propionamido-2-methyl-1,3-propanediol dipropionate at a temperature of approximately 245° C., in accordance with the procedure described in Example I. The resulting product was a water-white liquid soluble in acetone, alcohol and benzene, and has the following structural formula:

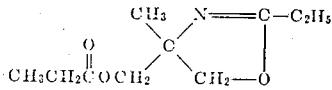

The 2-oxazolines produced as described above are very versatile and useful chemical compounds which find application in many different fields, for example, as plasticizers and in the preparation of surface active agents, vulcanization accelerators, and the like.

While the above description points out the preferred embodiments of my invention, it is to be understood that departures may be made therefrom within the scope of the invention as described and claimed.

What is claimed is:

1. A process for the preparation of 2-ethyl-4-methyl-4-propionoxymethyl-2-oxazoline, which comprises heating 2-propionamido-2-methyl-1,3-propanediol dipropionate to approximately 245° C., and continuously separating the thermally eliminated propionic acid from the heated mass.

2. A process for the preparation of 2-methyl-4,4-bis(acetoxymethyl)-2-oxazoline which comprises heating tris(acetoxymethyl) acetylaminoethane to 200–240° C., and continuously separating the thermally eliminated acetic acid from the heated mass.

3. A process for the preparation of 2-oxazolines from O-acylated amides of the following structural formula:

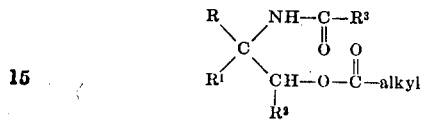

where the substituents R and $R^1$ represent members selected from the group consisting of hydrogen, aryl, alkyl and acyloxyalkyl, and $R^2$ and $R^3$ are members selected from the group consisting of hydrogen and alkyl, which comprises the steps of thermally eliminating the group

from said O-acylated amide and thereafter separating the resulting aliphatic acids as it is formed.

4. A process for the preparation of 2-oxazolines of the following structural formula:

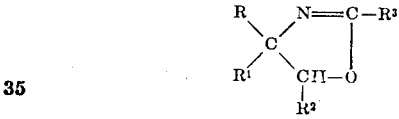

where the substituents R and $R^1$ represent a member selected from the group consisting of hydrogen, aryl, acyloxyalkyl and alkyl, and the substituents $R^2$ and $R^3$ are selected from the group consisting of hydrogen and alkyl, which comprises heating an O-acylated amide having the structure:

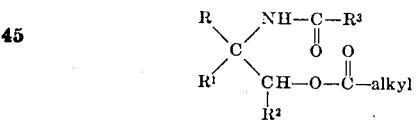

above the distillation temperature of the acid derived from the acyl group

which was cleaved from said amide by heating the latter at the aforesaid temperature, then continuously separating said acid from the resulting 2-oxazoline by distillation.

PHILIP F. TRYON.

CERTIFICATE OF CORRECTION.

Patent No. 2,372,410.  March 27, 1945.

PHILIP F. TYRON.

It is hereby certified that error appears in the printed specification of the above numbered patent requiring correction as follows: Page 1, first column, line 48, for "acyloxalkyl" read --acyloxyalkyl--; page 2, second column, line 6, claim 2, for "ethane" read --methane--; line 27, claim 3, for "acids" read --acid--; and that the said Letters Patent should be read with this correction therein that the same may conform to the record of the case in the Patent Office.

Signed and sealed this 14th day of August, A. D. 1945.

Leslie Frazer (Seal)  First Assistant Commissioner of Patents.